(12) United States Patent
Park

(10) Patent No.: US 12,264,400 B2
(45) Date of Patent: Apr. 1, 2025

(54) ELECTROCHEMICAL DEVICE

(71) Applicants: Hyundai Motor Company, Seoul (KR); Kia Corporation, Seoul (KR)

(72) Inventor: Joon Guen Park, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 570 days.

(21) Appl. No.: 17/678,751

(22) Filed: Feb. 23, 2022

(65) Prior Publication Data

US 2022/0411945 A1    Dec. 29, 2022

(30) Foreign Application Priority Data

Jun. 28, 2021  (KR) .................. 10-2021-0084292

(51) Int. Cl.
*C25B 13/02*    (2006.01)
*C25B 1/04*     (2021.01)
(Continued)

(52) U.S. Cl.
CPC ................ *C25B 13/02* (2013.01); *C25B 1/04* (2013.01); *C25B 9/63* (2021.01); *C25B 9/75* (2021.01)

(58) Field of Classification Search
CPC ........ C25B 13/02; C25B 9/63; H01M 8/0271; H01M 8/0273; H01M 8/0276
See application file for complete search history.

(56) References Cited

U.S. PATENT DOCUMENTS

| | | | | |
|---|---|---|---|---|
| 5,543,241 A | * | 8/1996 | Nishioka | H01M 8/1007 |
| | | | | 429/492 |
| 8,685,588 B2 | * | 4/2014 | Yamada | H01M 8/1004 |
| | | | | 429/480 |

(Continued)

FOREIGN PATENT DOCUMENTS

| | | | | |
|---|---|---|---|---|
| KR | 20130123048 A | * | 5/2012 | .......... H01M 8/0276 |
| KR | 10-1745114 B1 | | 6/2017 | |
| WO | WO-2014145795 A2 | * | 9/2014 | ............ H01M 8/004 |

OTHER PUBLICATIONS

Hwang et al., "Influence of properties of gas diffusion layers on the performance of polymer electrolyte-based unitized reversible fuel cells," *Int. J. Hydrogen Energy*, 36, pp. 1740-1753, (2011).

(Continued)

*Primary Examiner* — Ciel P Contreras
*Assistant Examiner* — Kevin Sylvester
(74) *Attorney, Agent, or Firm* — Morgan, Lewis & Bockius LLP

(57) ABSTRACT

An electrochemical apparatus includes a separator having a first reaction region and a second reaction region; a first reaction layer disposed to correspond to the first reaction region; a second reaction layer disposed to correspond to the second reaction region; a first partition wall portion protruding from one surface of the separator, disposed along a boundary between the first reaction layer and the second reaction layer, and including a first connecting flow path configured to connect the first reaction region and the second reaction region so that the first reaction region and the second reaction region fluidically communicate with each other through the first connecting flow path; and a first sealing member disposed at an end portion of the first partition wall portion and configured to seal a portion between the first reaction layer and the second reaction layer, (Continued)

enlarging a reaction region without increasing a size of a reaction layer.

13 Claims, 14 Drawing Sheets

(51) Int. Cl.
*C25B 9/63* (2021.01)
*C25B 9/75* (2021.01)

(56) References Cited

U.S. PATENT DOCUMENTS

| | | | | |
|---|---|---|---|---|
| 8,741,500 | B2* | 6/2014 | Fujita | H01M 8/1011 |
| | | | | 429/452 |
| 2006/0150398 | A1* | 7/2006 | Brunk | H01M 8/0273 |
| | | | | 429/534 |
| 2009/0311561 | A1* | 12/2009 | Rosenzweig | H01M 8/0232 |
| | | | | 429/404 |
| 2010/0200421 | A1* | 8/2010 | Aujollet | C25B 9/05 |
| | | | | 205/412 |
| 2013/0011704 | A1* | 1/2013 | Horne | H01M 8/20 |
| | | | | 320/128 |
| 2013/0330649 | A1* | 12/2013 | Takane | H01M 8/02 |
| | | | | 429/482 |
| 2017/0271697 | A1* | 9/2017 | Moon | H01M 4/926 |
| 2021/0126275 | A1* | 4/2021 | Stahl | H01M 8/0286 |

OTHER PUBLICATIONS

Kang et al., "Effects of various parameters of different porous transport layers in proton exchange membrane water electrolysis," *Electrochimica Acta*, 354:136641, pp. 1-14 (2020).

* cited by examiner

ELECTROCHEMICAL DEVICE

CROSS-REFERENCE TO RELATED APPLICATION

The present application claims priority to Korean Patent Application No. 10-2021-0084292 filed on Jun. 28, 2021, the entire contents of which is incorporated herein for all purposes by this reference.

BACKGROUND OF THE INVENTION

Field of the Invention

The present invention relates to an electrochemical device, and more particularly, to an electrochemical device capable of enlarging a reaction region without increasing a size of a reaction layer.

Description of Related Art

There is a consistently increasing need for research and development on alternative energy to cope with global warming and depletion of fossil fuel. Hydrogen energy is attracting attention as a practical solution for solving environment and energy issues.

In particular, because hydrogen has high energy density and properties suitable for application in a grid-scale, hydrogen is in the limelight as a future energy carrier.

A water electrolysis stack, which is one of electrochemical devices, refers to a device that produces hydrogen and oxygen by electrochemically decomposing water. The water electrolysis stack may be configured by stacking several tens or several hundreds of water electrolysis cells (unit cells) in series.

The water electrolysis cell includes a reaction layer and separators (an anode separator and a cathode separator) configured to cover two opposite surfaces of the reaction layer.

The reaction layer may include a membrane electrode assembly (MEA), a gas diffusion layer (GDL) disposed on one surface of the membrane electrode assembly, and a porous transport layer (PTL) disposed on the other surface of the membrane electrode assembly.

Meanwhile, voltage (V) applied to the water electrolysis stack increases in proportion to an increase in the number of water electrolysis cells (the number of stacks), and electric current (I) applied to the water electrolysis stack increases in proportion to an increase in reaction area (electrochemical reaction area) of the water electrolysis cell.

Recently, various attempts have been made to reduce the number of water electrolysis cells and increase (enlarge) the reaction area of the water electrolysis cell without changing electric power ($P=V \times I$) to be applied to the water electrolysis stack.

However, it is necessary to increase the size (i.e., enlarge the area) of the reaction layer (including the membrane electrode assembly, the gas diffusion layer, and the porous transport layer) as well as a separator to increase the reaction area of the water electrolysis cell. Because the separator is configured as a metal plate, an area of the separator may be easily increased. However, it is challenging to increase the area (size) of the reaction layer.

That is, because the membrane electrode assembly, the gas diffusion layer, and the porous transport layer, which form the reaction layer, have low rigidity and very small thicknesses, the membrane electrode assembly, the gas diffusion layer, and the porous transport layer are easily bent or broken as the membrane electrode assembly, the gas diffusion layer, and the porous transport layer increase in area (size).

In addition, if the area (size) of the reaction layer increases, a manufacturing apparatus of manufacturing the reaction layer needs to increase in size, which causes increases in sag and error of the manufacturing apparatus. For this reason, thickness deviations occur for respective regions (respective positions) of the membrane electrode assembly, the gas diffusion layer, and the porous transport layer, and safety and reliability deteriorate.

Moreover, a huge manufacturing apparatus and a large space are required to increase the areas (sizes) of the membrane electrode assembly, the gas diffusion layer, and the porous transport layer, which causes a deterioration in degree of design freedom and spatial utilization and an increase in costs.

Therefore, recently, various studies have been conducted to enlarge the reaction region while minimizing the deformation of and damage to the water electrolysis cell, but the study results are still insufficient. Accordingly, there is a need to develop a technology to enlarge the reaction region while minimizing the deformation of and damage to the water electrolysis cell.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an electrochemical device configured for enlarging a reaction region without increasing a size of a reaction layer.

The present invention has been made in an effort to enlarge a reaction region for an electrochemical reaction without increasing sizes of a membrane electrode assembly, a gas diffusion layer, and a porous transport layer.

The present invention, in various aspects thereof, has also been made in an effort to minimize deformation of and damage to a reaction layer and improve safety and reliability.

The present invention, in various aspects thereof, has also been made in an effort to simplify a structure and a manufacturing process and reduce costs.

The present invention, in various aspects thereof, has also been made in an effort to improve a degree of design freedom and spatial utilization.

The present invention, in various aspects thereof, has also been made in an effort to implement both a cathode separator and an anode separator using a single type of separator including the same structure.

The present invention, in various aspects thereof, has also been made in an effort to contribute to a reduction in weight and size of a product and reduce manufacturing costs.

The present invention, in various aspects thereof, has also been made in an effort to minimize a deviation of a position of a separator and improve safety and reliability.

The present invention, in various aspects thereof, has also been made in an effort to inhibit occurrence of contact resistance of a separator and improve mobility of electrons and efficiency.

The objects to be achieved by the exemplary embodiments are not limited to the above-mentioned objects, but also include objects or effects that may be understood from the solutions or embodiments described below.

Various aspects of the present invention provide an electrochemical device including: a separator including a first reaction region and a second reaction region; a first reaction layer disposed to correspond to the first reaction region; a second reaction layer disposed to correspond to the second reaction region; a first partition wall portion protruding from one surface of the separator, disposed along a boundary between the first reaction layer and the second reaction layer, and including a first connecting flow path configured to connect the first reaction region and the second reaction region so that the first reaction region and the second reaction region fluidically communicate with each other through the first connecting flow path; and a first sealing member disposed at an end portion of the first partition wall portion and configured to seal a portion between the first reaction layer and the second reaction layer.

This is to enlarge a reaction region without increasing a size of a reaction layer.

That is, it is necessary to increase the size (i.e., enlarge the area) of the reaction layer (including the membrane electrode assembly, the gas diffusion layer, and the porous transport layer) as well as the separator to increase the reaction area of the electrochemical device. Because the separator is configured as a metal plate, an area of the separator may be easily increased. However, it is challenging to increase the area (size) of the reaction layer.

Because the membrane electrode assembly, the gas diffusion layer, and the porous transport layer, which form the reaction layer, include low rigidity and very small thicknesses, the membrane electrode assembly, the gas diffusion layer, and the porous transport layer are easily bent or broken as the membrane electrode assembly, the gas diffusion layer, and the porous transport layer increase in area (size).

Meanwhile, the plurality of reaction layers each having a comparatively small size (e.g., a smaller size than the separator) may be combined (disposed), which makes it possible to enlarge the entire reaction region (reaction area) of the electrochemical device (unit cell) without increasing the size of the reaction layer.

If the boundary between the adjacent reaction layers is not sealed, different reaction fluids (e.g., water on the anode reaction surface and hydrogen on the cathode reaction surface) are mixed with each other at the boundary between the reaction layers. Therefore, the boundary between the adjacent reaction layers needs to be sealed.

However, because the adjacent reaction layers are sealed independently, an inlet manifold flow path into which water is introduced, an outlet manifold flow path from which water is discharged, and a hydrogen manifold flow path from which hydrogen is discharged need to be individually provided in the respective reaction layers. Therefore, an effective reaction region of each of the reaction layers (an area of a portion where the electrochemical reaction actually occurs) is determined as an area made by subtracting an area occupied by the inlet manifold flow path, the outlet manifold flow path, and the hydrogen manifold flow path from a total area of the reaction layer.

In other words, because the effective reaction area of the reaction layer is determined as the area made by subtracting the area occupied by the respective manifold flow paths (the inlet manifold flow path, the outlet manifold flow path, and the hydrogen manifold flow path) from the total area of the reaction layer, the effective reaction area of the reaction layer decreases as the areas occupied by the respective manifold flow paths increase.

However, according to the exemplary embodiment of the present invention, the first connecting flow path may be provided in the first partition wall portion disposed along the boundary between the first reaction layer and the second reaction layer, and the first connecting flow path may connect the first reaction region and the second reaction region so that the first reaction region and the second reaction region fluidically communicate with each other through the first connecting flow path. Therefore, only the specific type of manifold flow path may be provided in the first reaction region and the second reaction region without providing all types of manifold flow paths (e.g., the inlet manifold flow path and the outlet manifold flow path).

For example, only the inlet manifold flow path (e.g., the first manifold flow path) may be provided in any one of the first reaction region and the second reaction region, and only the outlet manifold flow path (e.g., the second manifold flow path) may be provided in the other of the first reaction region and the second reaction region.

As described above, only some manifold flow paths, among various types of manifold flow paths, may be provided in the first reaction region and the second reaction region without providing all of the various types of manifold flow paths, which makes it possible to reduce the area occupied by the manifold flow paths in the first reaction layer and the second reaction layer. Therefore, it is possible to further enlarge the effective reaction regions of the first reaction layer and the second reaction layer without increasing the sizes of the first reaction layer and the second reaction layer.

In addition, according to the exemplary embodiment of the present invention, the size of the reaction layer need not be increased to enlarge the reaction area of the electrochemical device. Therefore, it is possible to obtain an advantageous effect of minimizing the deformation of and damage to the reaction layer and improving the degree of design freedom and spatial utilization.

According to the exemplary embodiment of the present invention, a first channel through which a first reaction fluid flows may be provided in one surface of the separator, and a second channel through which a second reaction fluid flows may be provided in the other surface of the separator.

The present configuration allows the single separator to serve as both the cathode separator and the anode separator.

That is, generally, the cathode separator and the anode separator, which have different structures, need to be provided, and the two separators (the cathode separator and the anode separator) need to be stacked between the adjacent reaction layers, which makes it difficult to simplify the structure and the manufacturing process and reduce the overall weight of the electrochemical device.

Moreover, the electrons generated from the electrochemical device move along the separator. Generally, contact resistance increases because the two separators are stacked to be in close contact with each other between the adjacent reaction layers. As a result, there is a problem in that the increase in contact resistance decreases the mobility of the electrons and degrades the efficiency of the electrochemical device.

However, according to the exemplary embodiment of the present invention, the first channel (e.g., the water channel) may be disposed on one surface of the separator, and the second channel (e.g., the hydrogen channel) may be disposed on the other surface of the separator. Therefore, the single separator is configured as the cathode separator and the anode separator without stacking the two different separators (bringing the two different separators into close contact with each other). Therefore, it is possible to obtain an advantageous effect of simplifying the structure and the manufacturing process and reducing the overall weight of the electrochemical device.

Moreover, in the exemplary embodiment of the present invention, because the single separator is disposed between the adjacent reaction layers, it is possible to basically prevent the occurrence of contact resistance caused by the contact between the separators. Therefore, it is possible to obtain an advantageous effect of ensuring the mobility of the electrons in the electrochemical device and improving the efficiency of the electrochemical device.

The first reaction layer and the second reaction layer may each have various structures configured for generating the electrochemical reaction of the reaction fluid.

The first reaction layer and the second reaction layer may each have a smaller size than the separator.

For example, the first reaction layer may include: a first membrane electrode assembly; a first gas diffusion layer being in close contact with a first surface of the first membrane electrode assembly; a first porous transport layer being in close contact with a second surface of the first membrane electrode assembly; and a first gasket provided around the first membrane electrode assembly. The second reaction layer may include: a second membrane electrode assembly; a second gas diffusion layer being in close contact with a first surface of the second membrane electrode assembly; a second porous transport layer being in close contact with a second surface of the second membrane electrode assembly; and a second gasket provided around the second membrane electrode assembly. The first sealing member may cover a boundary between the first gasket and the second gasket.

According to the exemplary embodiment of the present invention, the electrochemical device may include: a first coupling protrusion protruding from the first sealing member; and a first coupling groove provided in the first partition wall portion and configured to accommodate the first coupling protrusion therein.

Because the first sealing member has the first coupling protrusion and the first coupling protrusion is coupled to the first coupling groove provided in the first partition wall portion as described above, the separation and deformation of the first sealing member may be inhibited. Therefore, it is possible to obtain an advantageous effect of stably maintaining the arrangement state of the first sealing member and stably maintaining the sealing performance implemented by the first sealing member.

According to the exemplary embodiment of the present invention, the electrochemical device may include: a second partition wall portion protruding from the other surface of the separator, disposed along the boundary between the first reaction layer and the second reaction layer, and including a second connecting flow path configured to connect the first reaction region and the second reaction region so that the first reaction region and the second reaction region fluidically communicate with each other through the second connecting flow path; and a second sealing member disposed at an end portion of the second partition wall portion and configured to seal a portion between the first reaction layer and the second reaction layer.

According to the exemplary embodiment of the present invention, the electrochemical device may include: a second coupling protrusion protruding from the second sealing member; and a second coupling groove provided in the second partition wall portion and configured to accommodate the second coupling protrusion therein.

Because the second sealing member includes the second coupling protrusion and the second coupling protrusion is coupled to the second coupling groove provided in the second partition wall portion as described above, the separation and deformation of the second sealing member may be inhibited. Therefore, it is possible to obtain an advantageous effect of stably maintaining the arrangement state of the second sealing member and stably maintaining the sealing performance implemented by the second sealing member.

According to the exemplary embodiment of the present invention, the electrochemical device may include: a first manifold flow path disposed in the first reaction region of the separator; and a second manifold flow path disposed in the second reaction region of the separator, and the first reaction fluid introduced into the first manifold flow path may pass through the first reaction region and the second reaction region and then be discharged through the second manifold flow path.

According to the exemplary embodiment of the present invention, the electrochemical device may include a third manifold flow path disposed in at least one of the first reaction region and the second reaction region, and the second reaction fluid may be discharged through the third manifold flow path.

According to the exemplary embodiment of the present invention, the electrochemical device may include an edge sealing member disposed along an edge portion of the separator and configured to seal portions between the separator and the first and second reaction layers.

According to the exemplary embodiment of the present invention, the electrochemical device may include: a second partition wall portion protruding from the other surface of the separator, disposed along the boundary between the first reaction layer and the second reaction layer, and configured to block the first reaction region and the second reaction region; and a second sealing member disposed at an end portion of the second partition wall portion and configured to seal a portion between the first reaction layer and the second reaction layer.

Because the second partition wall portion includes a continuous partition wall structure having no connecting flow path as described above, the pressing force of the second sealing member, which presses the boundary between the first gasket and the second gasket, may be entirely uniformly provided when the fastening pressure (the fastening pressure for fastening the plurality of unit cells) is applied to the electrochemical device. Therefore, it is possible to obtain an advantageous effect of further improving the sealing performance implemented by the second sealing member (the performance for sealing the gap between the first reaction layer and the second reaction layer).

In addition, the second sealing member may include a second coupling protrusion, and the second partition wall portion may include a second coupling groove that accommodates the second coupling protrusion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
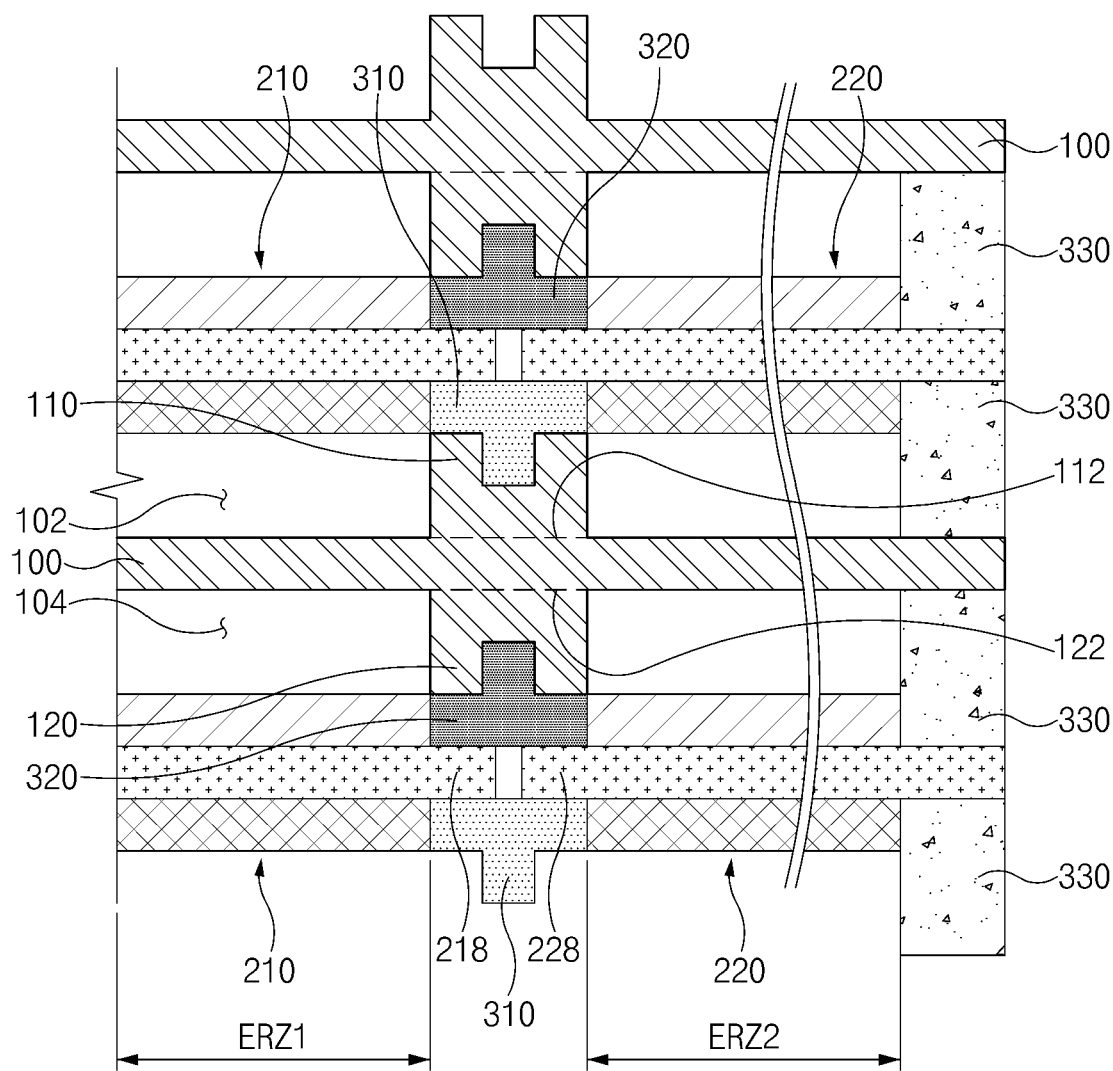
FIG. 1 is a view for explaining an electrochemical device according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings.

However, the technical spirit of the present invention is not limited to various exemplary embodiments described herein but may be implemented in various different forms. One or more of the constituent elements in the exemplary embodiments may be selectively combined and substituted for use within the scope of the technical spirit of the present invention.

In addition, unless otherwise specifically and explicitly defined and stated, the terms (including technical and scientific terms) used in the exemplary embodiments of the present invention may be construed as the meaning which may be commonly understood by the person with ordinary skill in the art to which various exemplary embodiments of the present invention pertains. The meanings of the commonly used terms such as the terms defined in dictionaries may be interpreted in consideration of the contextual meanings of the related technology.

In addition, the terms used in the exemplary embodiments of the present invention are for explaining the embodiments, not for limiting the present invention.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the exemplary embodiments of the present invention.

These terms are used only for discriminating one constituent element from another constituent element, and the nature, the sequences, or the orders of the constituent elements are not limited by the terms.

Furthermore, when one constituent element is referred to as being 'connected', 'coupled', or 'attached' to another constituent element, one constituent element may be connected, coupled, or attached directly to another constituent element or connected, coupled, or attached to another constituent element through yet another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 14, an electrochemical device 10 includes: a separator 100 including a first reaction region ERZ1 and a second reaction region ERZ2; a first reaction layer 210 disposed corresponding to the first reaction region ERZ1; a second reaction layer 220 disposed corresponding to the second reaction region ERZ2; a first partition wall portion 110 protruding from one surface of the separator 100, disposed along a boundary between the first reaction layer 210 and the second reaction layer 220, and including a first connecting flow path 112 configured to connect the first reaction region ERZ1 and the second reaction region ERZ2 so that the first reaction region ERZ1 and the second reaction region ERZ2 fluidically communicate with each other; and a first sealing member 310 disposed at an end portion of the first partition wall portion 110 and configured to seal a portion between the first reaction layer 210 and the second reaction layer 220.

For reference, the electrochemical device 10 according to the exemplary embodiment of the present invention may be used to generate electrochemical reactions between various reaction fluids in accordance with required conditions and design specifications. The present invention is not restricted or limited by the type and property of the reaction fluid used for the electrochemical device 10.

For example, the electrochemical device 10 according to the exemplary embodiment of the present invention may be used as a water electrolysis stack that produces hydrogen and oxygen by decomposing water through an electrochemical reaction.

The water electrolysis stack may be configured by stacking a plurality of unit cells in a reference stacking direction (e.g., an upward/downward direction based on FIG. 1).

The unit cell may include a reaction layer (including a first reaction layer and a second reaction layer), and the separators 100 stacked on two opposite surfaces of the reaction layer (including the first reaction layer and the second reaction layer). A water electrolysis stack may be made by stacking a plurality of unit cells in a reference stacking direction and then fastening endplates to two opposite end portions of the stack.

The separators 100, together with the reaction layer, form a single unit cell (water electrolysis cell). The separators are configured to block hydrogen and water separated by the reaction layer and ensure flow paths (flow fields) through which hydrogen and water flow.

In addition, the separators 100 may also be configured to distribute heat, which is generated from the unit cell, to the entire unit cell, and the excessively generated heat may be discharged to the outside by water flowing along the separators 100.

The separators 100 serve as separators that define independent flow paths (channels) for water and air in the water electrolysis stack.

A first channel 102 through which a first reaction fluid RF1 flows may be disposed on one surface of the separator 100, and a second channel 104 through which a second reaction fluid RF2 flows may be disposed on the other surface of the separator 100.

The first channel 102 and the second channel 104 define reaction regions for electrochemical reactions.

The first channel 102 may be any one of an anode channel and a cathode channel, and the second channel 104 may be the other of the anode channel and the cathode channel. For example, the first channel 102 may be the anode channel, and the second channel 104 may be the cathode channel.

The separator 100 may have various structures each including the first channel 102 and the second channel 104 and may be made of various materials. The present invention is not restricted or limited by the structure and material of the separator 100.

For example, the separator 100 may be provided in a form of an approximately quadrangular plate. The first channel 102 and the second channel 104 may be disposed at an approximately center portion of the separator 100. According to various exemplary embodiments of the present invention, the separator may include a shape of a circle or other shapes.

According to the exemplary embodiment of the present invention, the separator 100 may be made of thin film metal (e.g., titanium, stainless steel, Inconel, or aluminum). According to various exemplary embodiments of the present invention, the separator may be made of another material such as graphite or a carbon composite.

Figure 2:
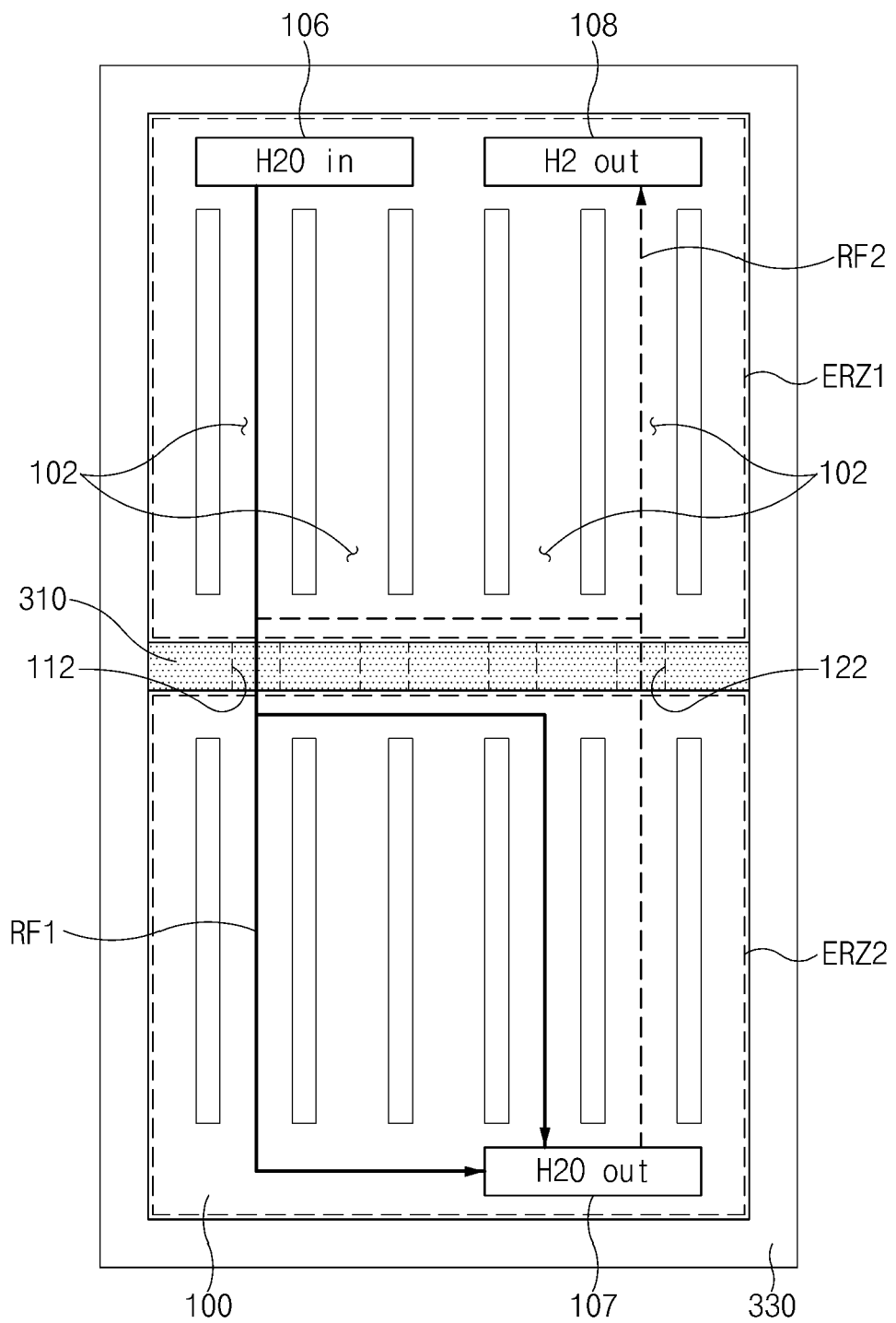
FIG. 2 is a top plan view for explaining a first reaction region and a second reaction region of the electrochemical device according to the exemplary embodiment of the present invention.

According to the exemplary embodiment of the present invention, the first channel 102 and the second channel 104 may each have a straight shape formed in a preset direction (e.g., in an upward/downward direction based on FIG. 2).

According to various exemplary embodiments of the present invention, the first channel and the second channel may be inclined with respect to a preset direction thereof. Alternatively, the first channel and the second channel may be disposed to intersect each other. Alternatively, the first channel and the second channel may each have a curved shape.

The first channel 102 and the second channel 104 may be provided in various ways in accordance with required conditions and design specifications.

For example, the first channel 102 and the second channel 104 may be provided by etching a portion of the separator 100.

According to various exemplary embodiments of the present invention, the first channel and the second channel may be provided in the separator by partially pressing a portion of the separator or cutting a surface of the separator through a cutting process.

The separators 100 are respectively stacked on the two opposite surfaces of the reaction layer so that the first channel 102 and the second channel 104 face each other with the first reaction layer 210 and the second reaction layer 220 interposed therebetween.

For example, referring to FIG. 1, the separators 100 having the same structure may be respectively stacked on upper portions of the first and second reaction layers 210 and 220 and lower portions of the first and second reaction layers 210 and 220. The separator 100 disposed on the lower portion of the reaction layer may be disposed so that the first channel 102 faces the lower surface of the reaction layer. The separator 100 disposed on the upper portion of the reaction layer may be disposed so that the second channel 104 faces the upper surface of the reaction layer.

The separators 100 may be respectively disposed on the upper portions of the first and second reaction layers 210 and 220 and the lower portions of the first and second reaction layers 210 and 220. The separator 100 is configured as both the anode separator and the cathode separator.

For example, water may flow along the first channel 102 provided between one surface (upper surface based on FIG. 1) of the separator 100 and the lower surfaces (based on FIG. 1) of the first and second reaction layers 210 and 220. Hydrogen may flow along the second channel 104 provided between the other surface (lower surface based on FIG. 1) of the separator 100 and the upper surfaces (based on FIG. 1) of the first and second reaction layers 210 and 220.

The present configuration allows the single separator 100 to serve as both the cathode separator and the anode separator.

That is, generally, two separators, which have different structures, need to be provided, and the two separators (the cathode separator and the anode separator) need to be stacked between the adjacent reaction layers, which makes it difficult to simplify the structure and the manufacturing process and reduce the overall weight of the electrochemical device.

Moreover, the electrons generated from the electrochemical device move along the separator. Generally, contact resistance increases because the two separators are stacked to be in close contact with each other between the adjacent reaction layers. As a result, there is a problem in that the increase in contact resistance decreases the mobility of the electrons and degrades the efficiency of the electrochemical device 10.

However, according to the exemplary embodiment of the present invention, the first channel 102 (e.g., the water channel) may be disposed on one surface of the separator 100, and the second channel 104 (e.g., the hydrogen channel) may be disposed on the other surface of the separator 100. Therefore, the single separator 100 is configured as the cathode separator and the anode separator without stacking the two different separators 100 (bringing the two different separators 100 into close contact with each other). Therefore, it is possible to obtain an advantageous effect of simplifying the structure and the manufacturing process and reducing the overall weight of the electrochemical device 10.

Moreover, in the exemplary embodiment of the present invention, because the single separator 100 is disposed between the adjacent reaction layers, it is possible to basically prevent the occurrence of contact resistance caused by the contact between the separators 100. Therefore, it is possible to obtain an advantageous effect of ensuring the mobility of the electrons in the electrochemical device 10 and improving the efficiency of the electrochemical device 10.

A plurality of reaction regions is defined on the separator 100.

In the instant case, the reaction region may be understood as a region in which the reaction layers (e.g., the first reaction layer and the second reaction layer) for generating the electrochemical reaction of the reaction fluid (e.g., water) are disposed.

The reaction region defined on the separator 100 may be variously changed in number and shape in accordance with required conditions and design specifications. The present invention is not restricted or limited by the number and shapes of the reaction regions defined on the separator 100.

For example, referring to FIG. 2, the two reaction regions may be disposed on the separator 100 in the upward/downward direction (based on FIG. 2) and each have an approximately quadrangular shape. According to various exemplary embodiments of the present invention, three or more reaction regions may be defined on the separator. Alternatively, the reaction region may have a shape of a circle or other shapes.

Figure 3:
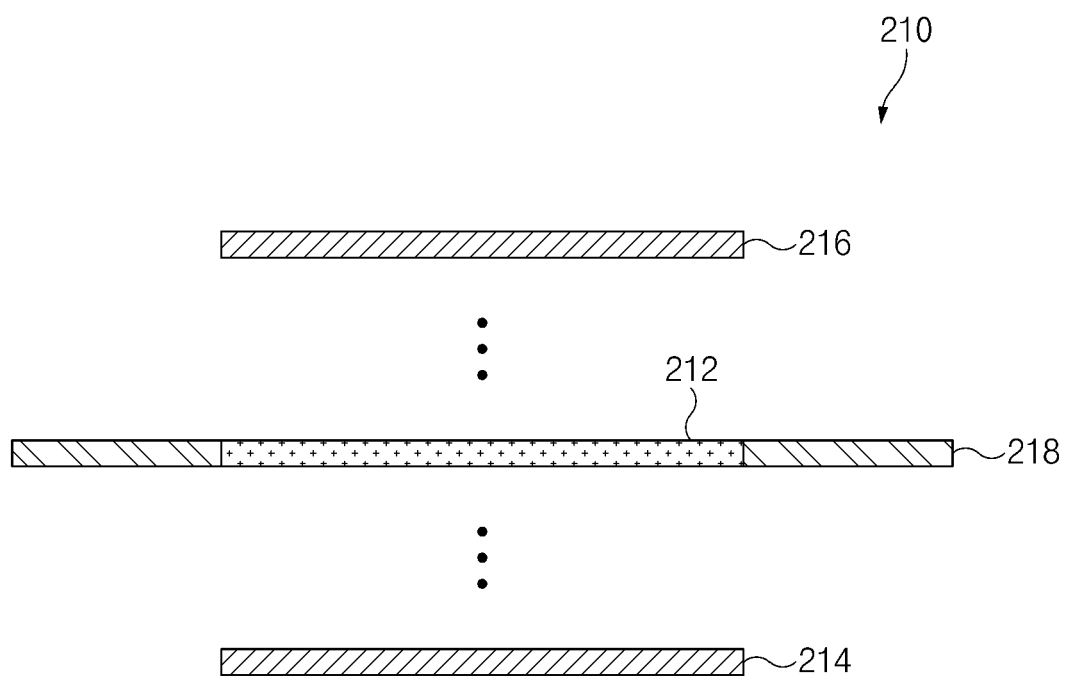
FIG. 3 is a view for explaining a first reaction layer of the electrochemical device according to the exemplary embodiment of the present invention.

Referring to FIG. 3, the first reaction layer 210 includes a structure corresponding to the first reaction region ERZ1. The first reaction layers 210 are disposed on the two opposite surfaces of the separator 100, respectively.

In the instant case, the configuration in which the first reaction layers 210 are disposed on the two opposite surfaces of the separator 100 may mean that the first reaction layer 210 is disposed between the adjacent separators 100.

The first reaction layer 210 may include various structures configured for generating the electrochemical reaction of the reaction fluid (e.g., water). The present invention is not restricted or limited by the type and structure of the first reaction layer 210.

The first reaction layer 210 has a smaller size than the separator 100.

For example, the first reaction layer 210 may include a first membrane electrode assembly 212, a first gas diffusion layer 214 being in close contact with a first surface of the first membrane electrode assembly 212, a first porous transport layer 216 being in close contact with a second surface of the first membrane electrode assembly 212, and a first gasket 218 disposed around the first membrane electrode assembly 212.

The first membrane electrode assembly 212 may be variously changed in structure and material in accordance with required conditions and design specifications. The present invention is not restricted or limited by the structure and material of the first membrane electrode assembly 212.

For example, the first membrane electrode assembly 212 may be configured by attaching catalyst electrode layers (e.g., an anode electrode layer and a cathode electrode layer), in which electrochemical reactions are generated, to two opposite surfaces of an electrolyte membrane. The first membrane electrode assembly 212 may have an approximately quadrangular shape.

The first gas diffusion layer 214 and the first porous transport layer 216 are configured to uniformly distribute the reaction fluids (the first reaction fluid and the second reaction fluid) and may each have a porous structure having pores with predetermined sizes.

For example, the first gas diffusion layer 214 may be made of carbon fibers or powder, and the first porous transport layer 216 may be made of metal fibers or powder.

The first gasket 218 may have a larger size than the first membrane electrode assembly 212 and surround a lateral periphery of the first membrane electrode assembly 212.

For example, the first gasket 218 may be made of an elastic material such as rubber, silicone, or urethane. The present invention is not restricted or limited by the material and properties of the first gasket 218.

For reference, water supplied to an anode electrode layer, which is an oxidation electrode for the water electrolysis, is separated into hydrogen ions (protons), electrons, and oxygen. The hydrogen ions move to a cathode electrode layer, which is a reduction electrode, through the electrolyte membrane, and the electrons move to the cathode through an external circuit. In addition, the oxygen may be discharged through an anode outlet, and the hydrogen ions and the electrons may be converted into hydrogen at the cathode.

Figure 4:
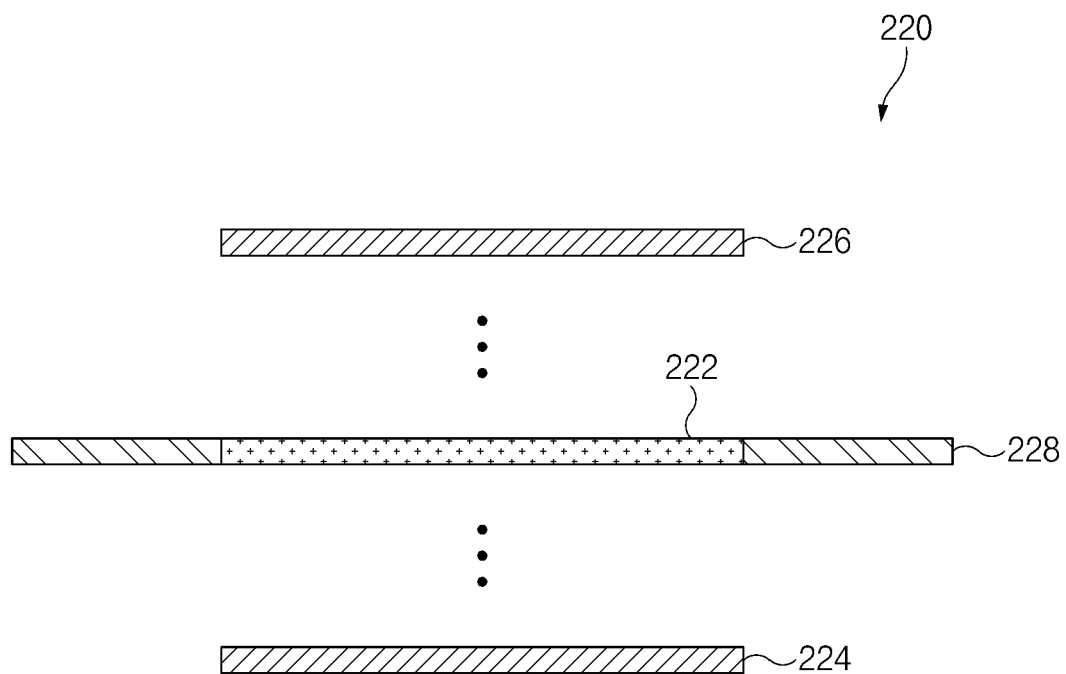
FIG. 4 is a view for explaining a second reaction layer of the electrochemical device according to the exemplary embodiment of the present invention.

Referring to FIG. 4, the second reaction layer 220 has a structure corresponding to the second reaction region ERZ2. The second reaction layers 220 are disposed on the two opposite surfaces of the separator 100.

In the instant case, the configuration in which the second reaction layers 220 are disposed on the two opposite surfaces of the separator 100 may mean that the second reaction layer 220 is disposed between the adjacent separators 100.

For example, the first reaction layer 210 and the second reaction layer 220 may have the same shape and size. The first reaction layer 210 and the second reaction layer 220 may be disposed to define an approximately straight boundary. According to various exemplary embodiments of the present invention, the first reaction layer and the second reaction layer may have different shapes and sizes. Alternatively, the first reaction layer and the second reaction layer may define a boundary including a curved shape or other shapes.

The second reaction layer 220 may have various structures configured for generating the electrochemical reaction of the reaction fluid (e.g., water). The present invention is not restricted or limited by the type and structure of the second reaction layer 220.

The second reaction layer 220 has a smaller size than the separator 100.

For example, the second reaction layer 220 may include a second membrane electrode assembly 222, a second gas diffusion layer 224 being in close contact with one surface of the second membrane electrode assembly 222, a second porous transport layer 226 being in close contact with the other surface of the second membrane electrode assembly 222, and a second gasket 228 disposed around the second membrane electrode assembly 222.

The second membrane electrode assembly 222 may be variously changed in structure and material in accordance with required conditions and design specifications. The present invention is not restricted or limited by the structure and material of the second membrane electrode assembly 222.

For example, the second membrane electrode assembly 222 may be configured by attaching catalyst electrode layers (e.g., an anode electrode layer and a cathode electrode layer), in which electrochemical reactions are generated, to two opposite surfaces of an electrolyte membrane. The second membrane electrode assembly 222 may include an approximately quadrangular shape.

The second gas diffusion layer 224 and the second porous transport layer 226 are configured to uniformly distribute the reaction fluids (the first reaction fluid and the second reaction fluid) and may each have a porous structure including pores with predetermined sizes.

For example, the second gas diffusion layer 224 may be made of carbon fibers or powder, and the second porous transport layer 226 may be made of metal fibers or powder.

The second gasket 228 may have a larger size than the second membrane electrode assembly 222 and surround a lateral periphery of the second membrane electrode assembly 222.

For example, the second gasket 228 may be made of an elastic material such as rubber, silicone, or urethane. The present invention is not restricted or limited by the material and properties of the second gasket 228.

Figure 5:
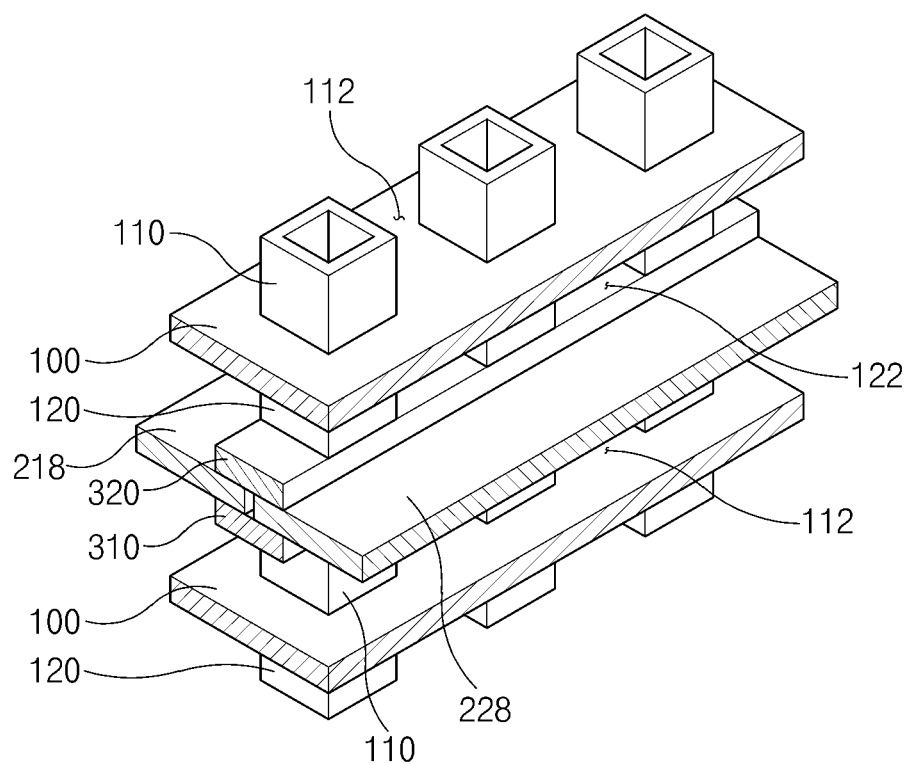
FIG. 5 and FIG. 6 are views for explaining a first partition wall portion and a second partition wall portion of the electrochemical device according to the exemplary embodiment of the present invention.
Figure 6:
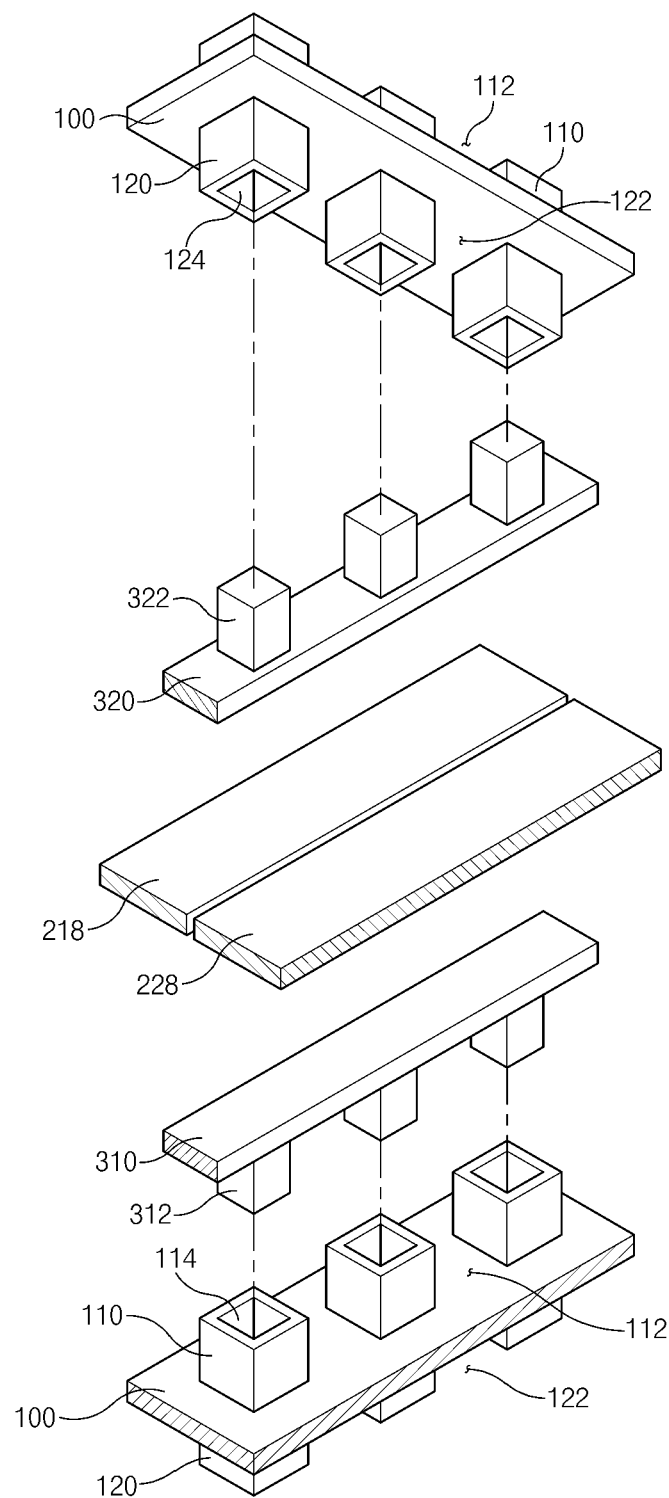
Figure 7:
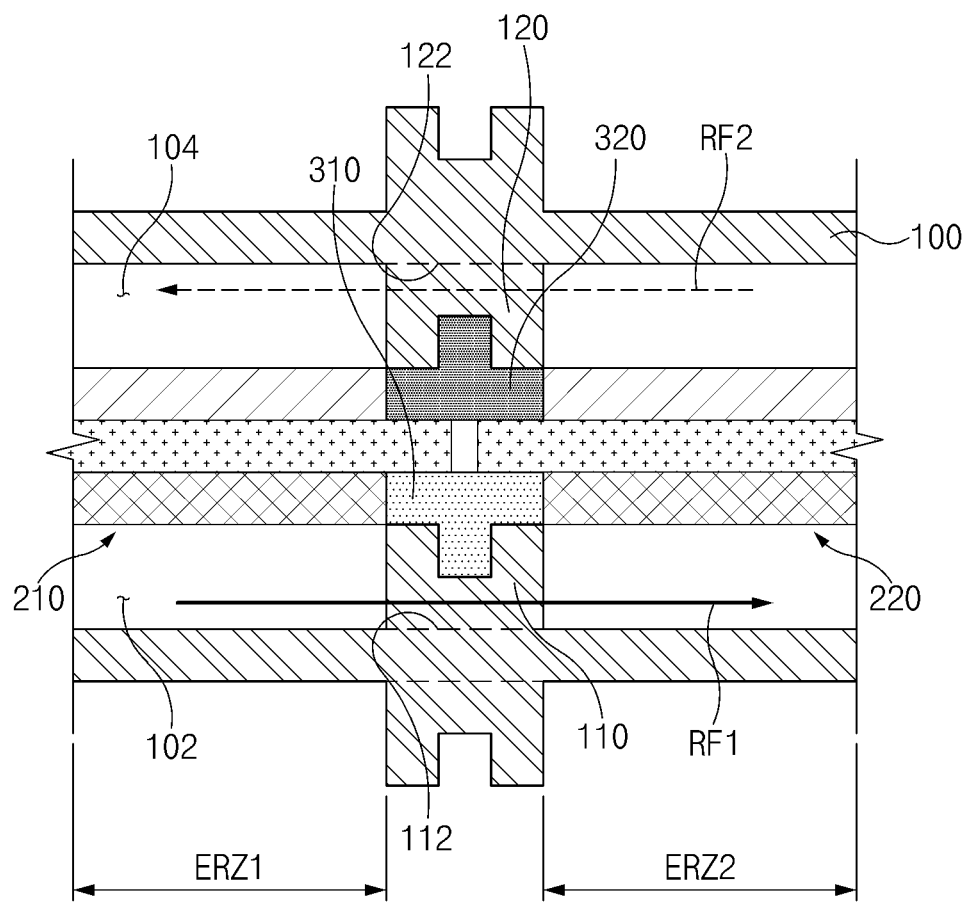
FIG. 7 and FIG. 8 are views for explaining a flow of a first reaction fluid and a flow of a second reaction fluid in the electrochemical device according to the exemplary embodiment of the present invention.
Figure 8:
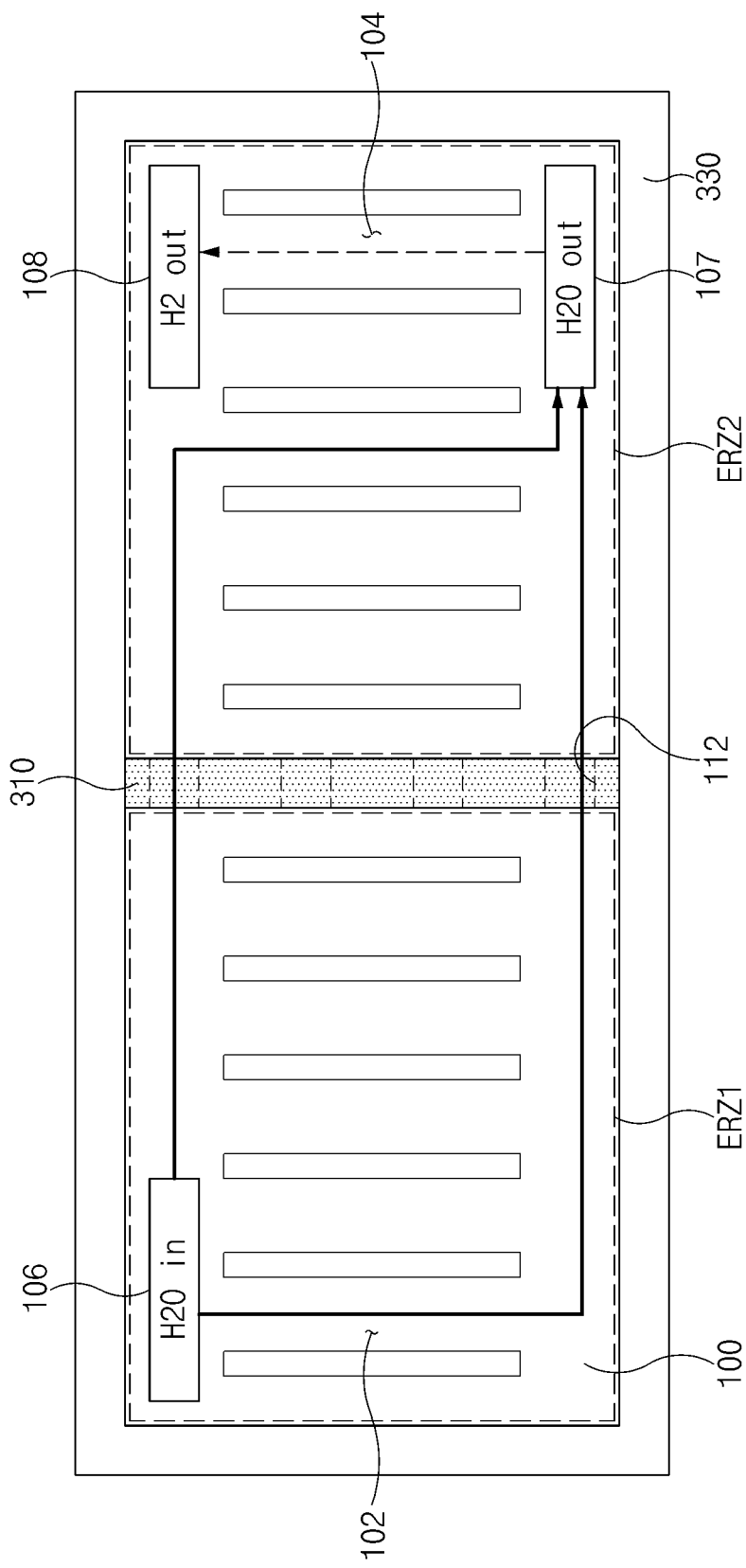

Referring to FIG. 5, FIG. 6 and FIG. 7, the first partition wall portion 110 protrudes from one surface (e.g., the upper surface) of the separator 100 and is disposed along the boundary between the first reaction layer 210 and the second reaction layer 220. The first partition wall portion 110 includes the first connecting flow path 112 that connects the first reaction region ERZ1 (e.g., the first reaction region below the first reaction layer) and the second reaction region ERZ2 (e.g., the second reaction region below the second reaction layer) so that the first reaction region ERZ1 and the second reaction region ERZ2 fluidically communicate with each other.

In the instant case, the first connecting flow path 112 may be defined as a flow path (passageway) that includes a hole shape and connects the first reaction region ERZ1 and the second reaction region ERZ2 so that the first reaction region ERZ1 and the second reaction region ERZ2 spatially fluidically communicate with each other.

The first partition wall portion 110 may have various structures each including the first connecting flow path 112. The present invention is not restricted or limited by the structure and shape of the first partition wall portion 110.

For example, the first partition wall portion 110 may include a plurality of first partition wall protrusions disposed along the boundary between the first reaction layer 210 and the second reaction layer 220 and spaced from one another at predetermined intervals. The first connecting flow path 112, which connects the first reaction region ERZ1 and the second reaction region ERZ2 so that the first reaction region ERZ1 and the second reaction region ERZ2 fluidically communicate with each other, is disposed between the adjacent first partition wall protrusions.

For example, the first partition wall protrusion may include a quadrangular column shape.

The first partition wall protrusions and the first connecting flow paths 112 may be disposed alternately along the boundary between the first reaction layer 210 and the second reaction layer 220. According to various exemplary embodiments of the present invention, the first partition wall portion may include only a single first connecting flow path. Alternatively, the first connecting flow paths and the first partition wall protrusions may be irregularly disposed.

Because the first connecting flow path 112 is provided in the first partition wall portion 110 disposed along the boundary between the first reaction region ERZ1 and the second reaction region ERZ2 as described above, the reaction fluid (e.g., the first reaction fluid) introduced into the first reaction region ERZ1 may be supplied to the second reaction region ERZ2 through the first connecting flow path 112.

The first sealing member 310 is disposed at the end portion of the first partition wall portion 110 and seals a portion between the first reaction layer 210 and the second reaction layer 220.

In the instant case, the configuration in which the portion between the first reaction layer 210 and the second reaction layer 220 is sealed may mean that a gap between the first reaction layer 210 and the second reaction layer 220 is sealed.

Because the first sealing member 310 seals the portion between the first reaction layer 210 and the second reaction layer 220 as described above, it is possible to obtain an advantageous effect of inhibiting the first reaction fluid RF1 flowing through the first channel 102 below (based on FIG. 7) the reaction layer (the first reaction layer and the second reaction layer) and the second reaction fluid RF2 flowing through the second channel 104 above (based on FIG. 7) the reaction layer (the first reaction layer and the second reaction layer) from being mixed with each other through the gap between the first reaction layer 210 and the second reaction layer 220 (i.e., the gap between the first gasket and the second gasket).

The first sealing member 310 may include various structures configured for sealing the portion between the first reaction layer 210 and the second reaction layer 220. The present invention is not restricted or limited by the structure of the first sealing member 310.

For example, the first sealing member 310 may include a continuous band or rod shape having a length corresponding to the boundary between the first reaction layer 210 and the second reaction layer 220 (between the first gasket and the second gasket).

The first sealing member 310 may cover the boundary between the first gasket 218 and the second gasket 228.

In the instant case, the configuration in which the first sealing member 310 covers the boundary between the first gasket 218 and the second gasket 228 may mean that a portion of the first sealing member 310 covers an outermost peripheral edge portion of the first gasket 218 (an end portion of the first gasket 218 adjacent to the second gasket 228), and the remaining portion of the first sealing member 310 covers and is in close contact with an outermost peripheral edge portion of the second gasket 228 (an end portion of the second gasket 228 adjacent to the first gasket 218).

Because the first sealing member 310 covers the boundary between the first gasket 218 and the second gasket 228 as described above, the boundary between the first gasket 218 and the second gasket 228 may be pressed by the first sealing member 310 simultaneously when a fastening pressure (fastening pressure for fastening the plurality of unit cells) is applied to the electrochemical device 10. Therefore, it is possible to obtain an advantageous effect of more stably ensuring the sealing performance implemented by the first sealing member 310.

According to the exemplary embodiment of the present invention, the electrochemical device 10 may include a first coupling protrusion 312 protruding from the first sealing member 310, and a first coupling groove 114 provided in the first partition wall portion 110 and configured to accommodate the first coupling protrusion 312.

For example, the first coupling protrusion 312 may include a quadrangular cross-section. The first coupling groove 114 may include a quadrangular groove shape corresponding to the first coupling protrusion 312.

Because the first sealing member 310 includes the first coupling protrusion 312 and the first coupling protrusion 312 is coupled to the first coupling groove 114 provided in the first partition wall portion 110 as described above, the separation and deformation of the first sealing member 310 may be inhibited. Therefore, it is possible to obtain an advantageous effect of stably maintaining the arrangement state of the first sealing member 310 and stably maintaining the sealing performance implemented by the first sealing member 310.

In the exemplary embodiment of the present invention illustrated and described above, the example has been described in which the first coupling protrusion 312 is provided on the first sealing member 310 and the first coupling groove 114 is provided in the first partition wall portion 110. However, according to various exemplary embodiments of the present invention, the first coupling protrusion may be provided on the first partition wall portion and the first coupling groove may be provided in the first sealing member.

Referring back to FIG. 5, FIG. 6 and FIG. 7, according to the exemplary embodiment of the present invention, the electrochemical device 10 may include: a second partition wall portion 120 protruding from the other surface of the separator 100, disposed along the boundary between the first reaction layer 210 and the second reaction layer 220, and including a second connecting flow path 122 configured to connect the first reaction region ERZ1 and the second reaction region ERZ2 so that the first reaction region ERZ1 and the second reaction region ERZ2 fluidically communicate with each other; and a second sealing member 320 disposed at an end portion of the second partition wall portion 120 and configured to seal a portion between the first reaction layer 210 and the second reaction layer 220.

The second partition wall portion 120 protrudes from the other surface (e.g., the lower surface) of the separator 100 and is disposed along the boundary between the first reaction layer 210 and the second reaction layer 220. The second partition wall portion 120 includes the second connecting flow path 122 that connects the first reaction region ERZ1 (e.g., the first reaction region above the first reaction layer) and the second reaction region ERZ2 (e.g., the second reaction region above the second reaction layer) so that the first reaction region ERZ1 and the second reaction region ERZ2 fluidically communicate with each other.

In the instant case, the second connecting flow path 122 may be defined as a flow path (passageway) that has a hole shape and connects the first reaction region ERZ1 and the second reaction region ERZ2 so that the first reaction region ERZ1 and the second reaction region ERZ2 spatially fluidically communicate with each other.

The second partition wall portion 120 may have various structures each including the second connecting flow path 122. The present invention is not restricted or limited by the structure and shape of the second partition wall portion 120.

For example, the second partition wall portion 120 may include a plurality of second partition wall protrusions disposed along the boundary between the first reaction layer 210 and the second reaction layer 220 and spaced from one another at predetermined intervals. The second connecting flow path 122, which connects the first reaction region ERZ1 and the second reaction region ERZ2 so that the first reaction region ERZ1 and the second reaction region ERZ2 fluidically communicate with each other, is disposed between the adjacent second partition wall protrusions.

For example, the second partition wall protrusion may have a quadrangular column shape.

The second partition wall protrusions and the second connecting flow paths 122 may be disposed alternately along the boundary between the first reaction layer 210 and the second reaction layer 220. According to various exemplary embodiments of the present invention, the second partition wall portion may include only a single second connecting flow path. Alternatively, the second connecting flow paths and the second partition wall protrusions may be irregularly disposed.

Because the second connecting flow path 122 is provided in the second partition wall portion 120 disposed along the boundary between the first reaction region ERZ1 and the second reaction region ERZ2 as described above, the reaction fluid (e.g., the second reaction fluid) converted in the first reaction region ERZ1 may be supplied to the second reaction region ERZ2 through the second connecting flow path 122.

The second sealing member 320 is disposed at the end portion of the second partition wall portion 120 and seals a portion between the first reaction layer 210 and the second reaction layer 220.

In the instant case, the configuration in which the portion between the first reaction layer 210 and the second reaction layer 220 is sealed may mean that a gap between the first reaction layer 210 and the second reaction layer 220 is sealed.

Because the second sealing member 320 seals the portion between the first reaction layer 210 and the second reaction layer 220 as described above, it is possible to obtain an advantageous effect of more effectively inhibiting the first reaction fluid RF1 flowing through the first channel 102 below (based on FIG. 7) the reaction layer (the first reaction layer and the second reaction layer) and the second reaction fluid RF2 flowing through the second channel 104 above (based on FIG. 7) the reaction layer (the first reaction layer and the second reaction layer) from being mixed with each other through the gap between the first reaction layer 210 and the second reaction layer 220 (i.e., the gap between the first gasket and the second gasket).

The second sealing member 320 may have various structures configured for sealing the portion between the first reaction layer 210 and the second reaction layer 220. The present invention is not restricted or limited by the structure of the second sealing member 320.

For example, the second sealing member 320 may include a continuous band or rod shape having a length corresponding to the boundary between the first reaction layer 210 and the second reaction layer 220 (between the first gasket and the second gasket).

The second sealing member 320 may cover the boundary between the first gasket 218 and the second gasket 228.

The second sealing member 320 faces the first sealing member 310 with the first and second gaskets 218 and 228 interposed therebetween.

In the instant case, the configuration in which the second sealing member 320 covers the boundary between the first gasket 218 and the second gasket 228 may mean that a portion of the second sealing member 320 covers an outermost peripheral edge portion of the first gasket 218 (an end portion of the first gasket 218 adjacent to the second gasket 228), and the remaining portion of the second sealing member 320 covers and is in close contact with an outermost peripheral edge portion of the second gasket 228 (an end portion of the second gasket 228 adjacent to the first gasket 218).

Because the second sealing member 320 covers the boundary between the first gasket 218 and the second gasket 228 as described above, the boundary between the first gasket 218 and the second gasket 228 may be pressed by the second sealing member 320 simultaneously when a fastening pressure (fastening pressure for fastening the plurality of unit cells) is applied to the electrochemical device 10. Therefore, it is possible to obtain an advantageous effect of more stably ensuring the sealing performance implemented by the second sealing member 320.

According to the exemplary embodiment of the present invention, the electrochemical device 10 may include a second coupling protrusion 322 protruding from the second sealing member 320, and a second coupling groove 124 provided in the second partition wall portion 120 and configured to accommodate the second coupling protrusion 322.

For example, the second coupling protrusion 322 may have a quadrangular cross-section. The second coupling groove 124 may have a quadrangular groove shape corresponding to the second coupling protrusion 322.

Because the second sealing member 320 includes the second coupling protrusion 322 and the second coupling protrusion 322 is coupled to the second coupling groove 124 provided in the second partition wall portion 120 as described above, the separation and deformation of the second sealing member 320 may be inhibited. Therefore, it is possible to obtain an advantageous effect of stably maintaining the arrangement state of the second sealing member 320 and stably maintaining the sealing performance implemented by the second sealing member 320.

In the exemplary embodiment of the present invention illustrated and described above, the example has been described in which the second coupling protrusion 322 is provided on the second sealing member 320 and the second coupling groove 124 is provided in the second partition wall portion 120. However, according to various exemplary embodiments of the present invention, the second coupling protrusion may be provided on the second partition wall portion and the second coupling groove may be provided in the second sealing member.

Referring to FIGS. 2 and 7, according to the exemplary embodiment of the present invention, the electrochemical device 10 may include a first manifold flow path 106 provided in the first reaction region ERZ1 of the separator 100, and a second manifold flow path 107 provided in the second reaction region ERZ2 of the separator 100. The first reaction fluid RF1 introduced into the first manifold flow path 106 may pass through the first reaction region ERZ1 and the second reaction region ERZ2 and then be discharged through the second manifold flow path 107.

For example, the first manifold flow path 106 may be disposed at a left side (based on FIG. 2) of an uppermost end portion of the first reaction region ERZ1, the second manifold flow path 107 may be disposed at a right side (based on FIG. 2) of a lowermost end portion of the second reaction region ERZ2, and the first reaction fluid RF1 (e.g., water) introduced into the first manifold flow path 106 may sequentially pass through the first reaction region ERZ1 and the second reaction region ERZ2 and then be discharged through the second manifold flow path 107.

According to various exemplary embodiments of the present invention, a plurality of first manifold flow paths 106 may be disposed at the uppermost end portion of the first reaction region ERZ1, and a plurality of second manifold flow paths 107 may be disposed at the lowermost end portion of the second reaction region ERZ2. The present invention is not restricted or limited by the number of first manifold flow paths 106, the number of second manifold flow paths 107, and the arrangement interval between the first manifold flow path 106 and the second manifold flow path 107.

In addition, according to the exemplary embodiment of the present invention, the electrochemical device 10 may include a third manifold flow path 108 provided in at least any one of the first reaction region ERZ1 and the second reaction region ERZ2. The second reaction fluid RF2 may be discharged through the third manifold flow path 108.

For example, the third manifold flow path 108 may be disposed at a right side (based on FIG. 2) of the uppermost end portion of the first reaction region ERZ1. The second reaction fluid RF2 converted in the second channel 104 may be discharged through the third manifold flow path 108.

Figure 9:
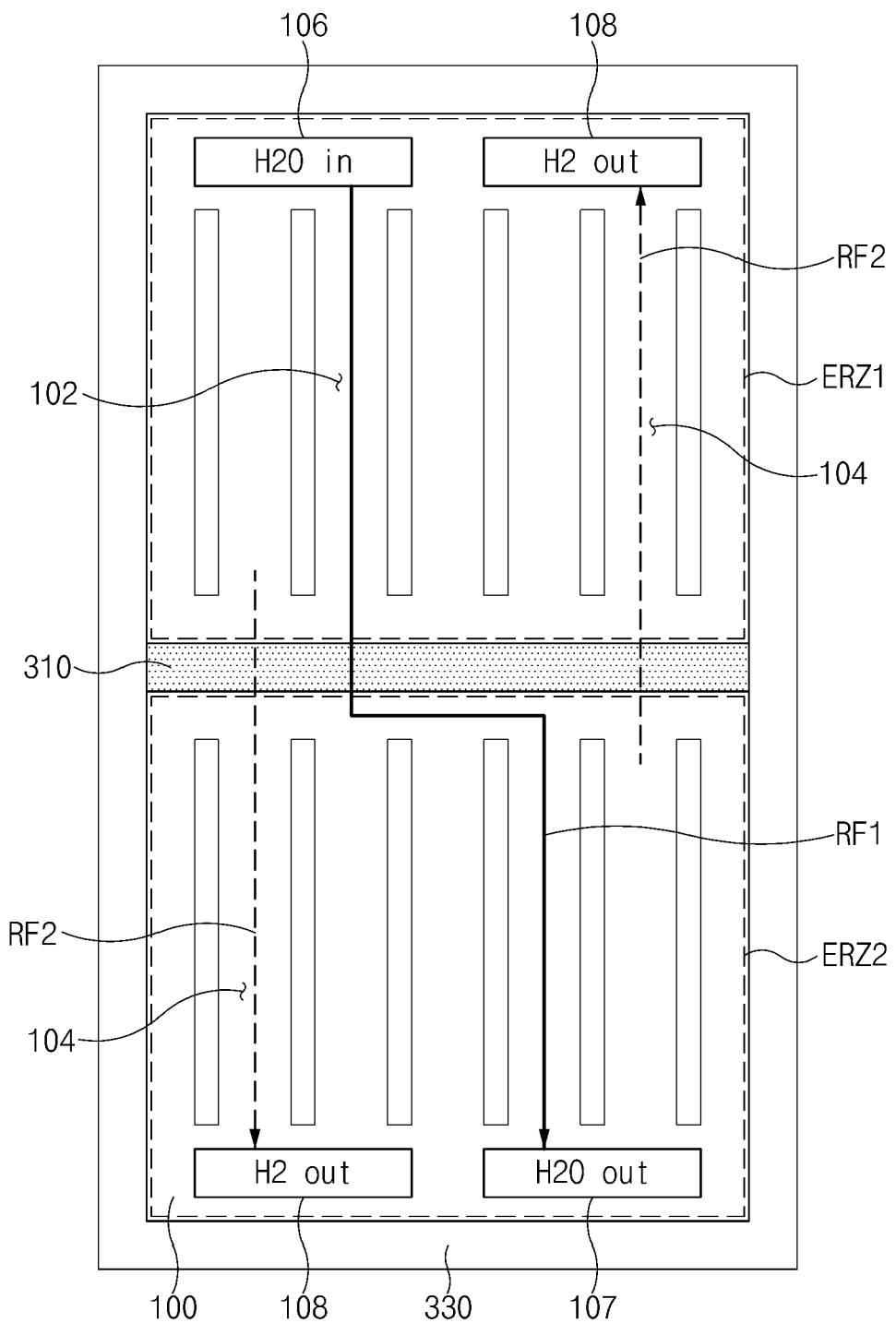
FIG. 9, FIG. 10 and FIG. 11 are views for explaining another example of the electrochemical device according to the exemplary embodiment of the present invention.

As illustrated in FIG. 9, according to various exemplary embodiments of the present invention, the third manifold flow paths 108 are respectively disposed at the right side (based on FIG. 9) of the uppermost end portion of the first reaction region ERZ1 and the left side (based on FIG. 9) of the lowermost end portion of the second reaction region ERZ2. The second reaction fluid RF2 converted in the second channel 104 may be discharged through the two third manifold flow paths 108 respectively disposed in the first reaction region ERZ1 and the second reaction region ERZ2.

As described above, the third manifold flow paths 108 may be respectively disposed in the first reaction region ERZ1 and the second reaction region ERZ2, and the second reaction fluid RF2 (e.g., hydrogen) may be more smoothly discharged through the third manifold flow paths 108. Therefore, it is possible to reduce a discharge pressure of the second reaction fluid RF2 and decrease material transmission resistance, facilitating a generation reaction of the second reaction fluid RF2.

The first to third manifold flow paths 106, 107, and 108 may be variously changed in structure and shape in accordance with required conditions and design specifications. The present invention is not restricted or limited by the structures and shapes of the first to third manifold flow paths 106, 107, and 108.

The first manifold flow path 106, the second manifold flow path 107, and the third manifold flow path 108 may include the same size and shape and penetrate the separator 100.

For example, the first manifold flow path 106, the second manifold flow path 107, and the third manifold flow path 108 may have the same size and quadrangular shape. According to various exemplary embodiments of the present invention, the first to third manifold flow paths may each have a circular shape or other shapes.

Referring to FIG. 1 and FIG. 2, according to the exemplary embodiment of the present invention, the electrochemical device 10 may include an edge sealing member 330 disposed along an edge portion of the separator 100 and configured to seal portions between the separator 100 and the first and second reaction layers 210 and 220.

In the instant case, the configuration in which the portions between the separator 100 and the reaction layer (the first reaction layer and the second reaction layer) are sealed means that portions between the reaction layer and one surface of the separator 100 and between the reaction layer and the other surface of the separator 100 are sealed.

The edge sealing member 330 may have various structures configured for sealing the portions between the separator 100 and the reaction layer (the first reaction layer and the second reaction layer). The present invention is not restricted or limited by the structure and shape of the edge sealing member 330.

For reference, the edge sealing member 330 may be made of an elastic material such as rubber, silicone, or urethane. The present invention is not restricted or limited by the material and properties of the edge sealing member 330.

For example, the edge sealing member 330 may be manufactured separately from the separator 100 and then attached to (seated on) the separator 100. According to various exemplary embodiments of the present invention, the edge sealing member may be provided on the separator by applying or transferring an elastic material to the separator or by performing a printing process using the elastic material. Alternatively, the edge sealing member may be provided on the separator by injection molding.

In the exemplary embodiment of the present invention illustrated and described above, the example has been described in which the two reaction regions are arranged in the 1×2 matrix (or the 2×1 matrix) on the separator 100. However, according to various exemplary embodiments of the present invention, four reaction regions may be arranged in the 2×2 matrix on the separator 100 to further enlarge the entire reaction region of the electrochemical device 10.

Figure 10:
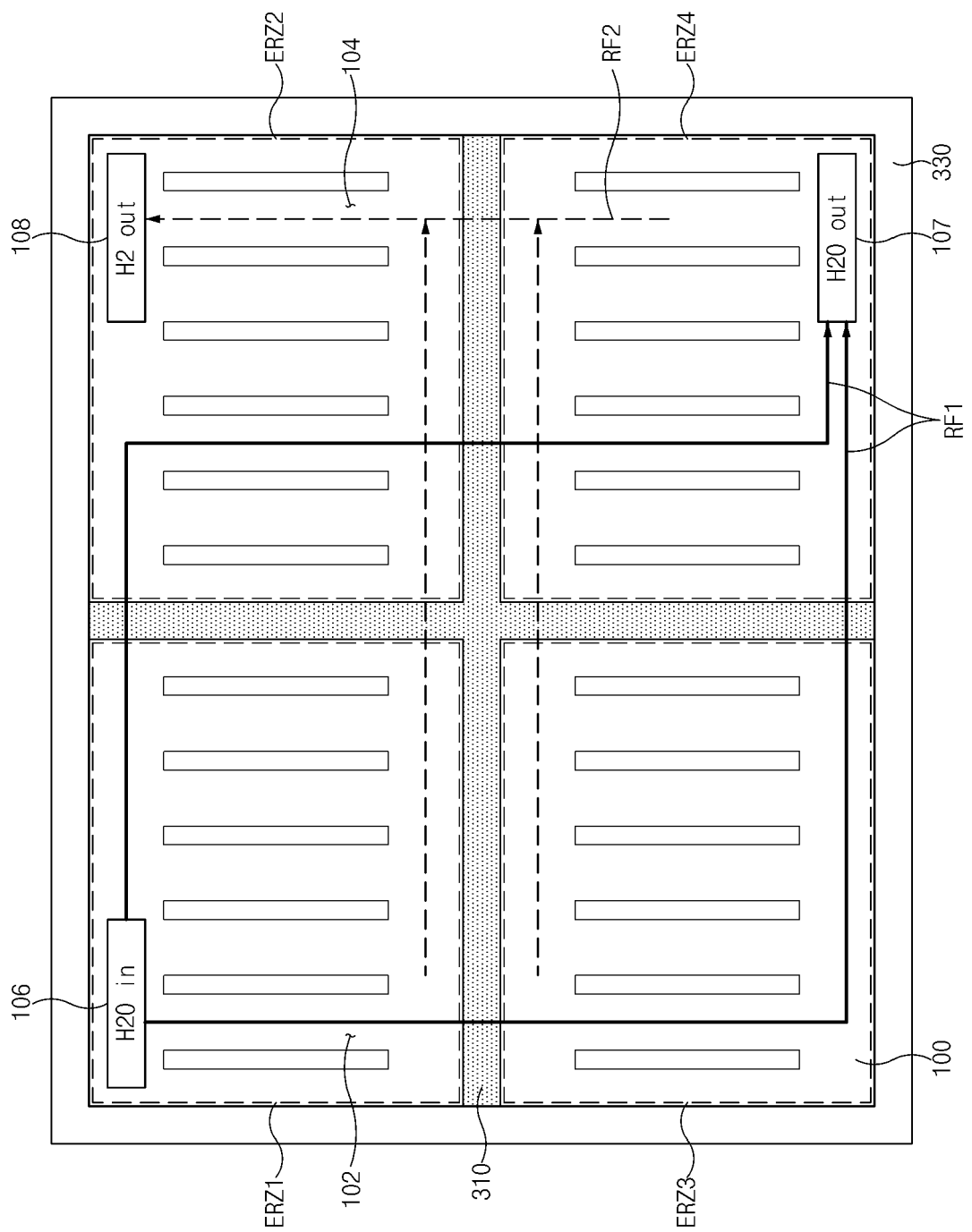
Figure 11:
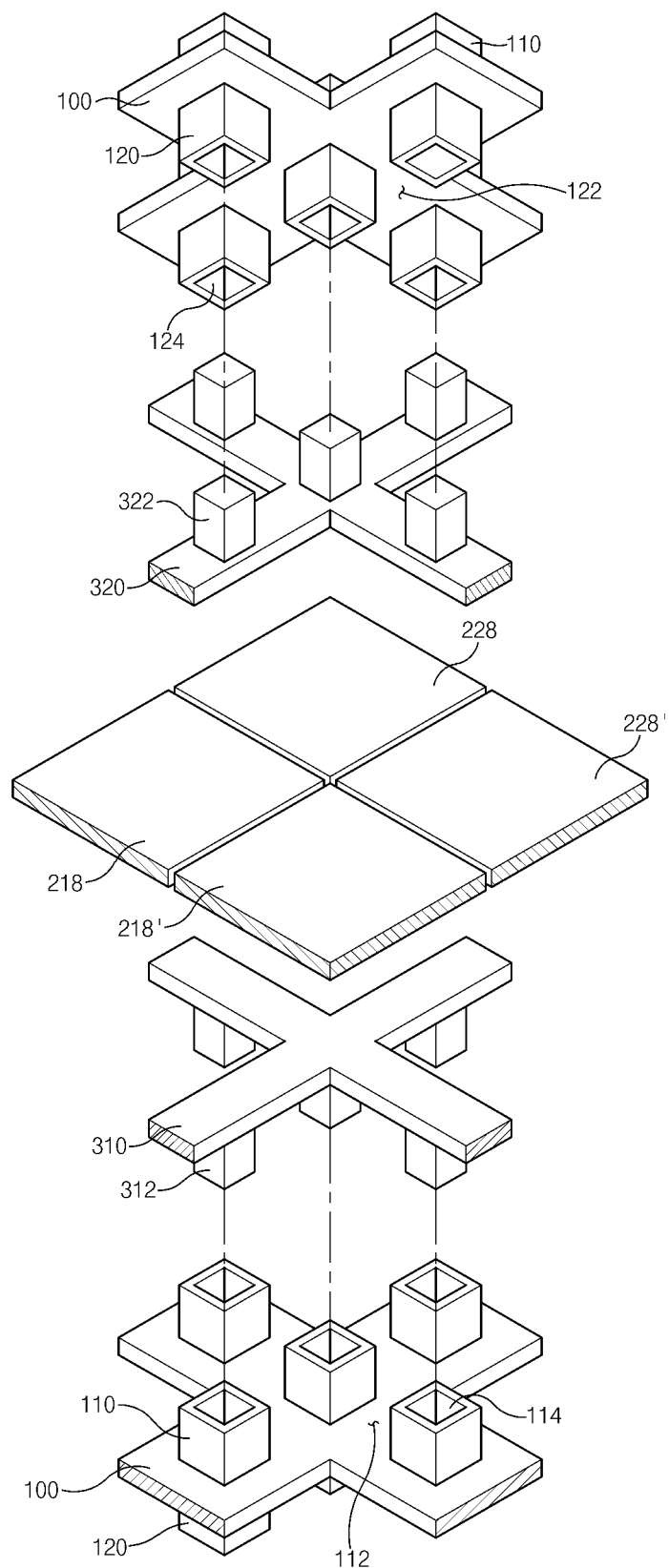

That is, referring to FIG. 10, and FIG. 11, according to various exemplary embodiments of the present invention, the first reaction region ERZ1, the second reaction region ERZ2, a third reaction region ERZ3, and a fourth reaction region ERZ4 may be arranged in the 2×2 matrix on the separator 100.

Like the above-mentioned embodiment, the reaction layers 210 (see FIG. 3) may be respectively disposed in the first reaction region ERZ1, the second reaction region ERZ2, the third reaction region ERZ3, and the fourth reaction region ERZ4.

The first partition wall portion 110 including the first connecting flow path 112 may be provided on one surface of the separator 100 and disposed along boundaries between gaskets 218, 218', 228, and 228' of the adjacent reaction layers. The second partition wall portion 120 including the second connecting flow path 122 may be provided on the other surface of the separator 100 and disposed along the boundaries between the adjacent reaction layers.

For example, the first partition wall portion 110 and the second partition wall portion 120 may each have an approximately cross shape corresponding to the boundaries between the adjacent reaction layers. The first sealing member 310 may be disposed at the end portion of the first partition wall portion 110, and the second sealing member 320 may be disposed at the end portion of the second partition wall portion 120.

The first reaction fluid RF1 (e.g., water) introduced into the first manifold flow path 106 disposed in the first reaction region ERZ1 may sequentially pass through the second reaction region ERZ2 and the third reaction region ERZ3 and then be discharged through the second manifold flow path 107 disposed in the fourth reaction region ERZ4.

In the exemplary embodiment of the present invention illustrated and described above, the example has been described in which the first reaction fluid RF1 flows from the first reaction region ERZ1 to the second reaction region ERZ2 through the first connecting flow path 112 provided in the first partition wall portion 110 and the second reaction fluid RF2 flows from the second reaction region ERZ2 to the first reaction region ERZ1 through the second connecting flow path 122 provided in the second partition wall portion 120. However, according to various exemplary embodiments of the present invention, only the first reaction fluid RF1 (e.g., water) may flow while intersecting the respective reaction regions, and the second reaction fluid RF2 may be individually discharged from the respective reaction regions.

Figure 12:
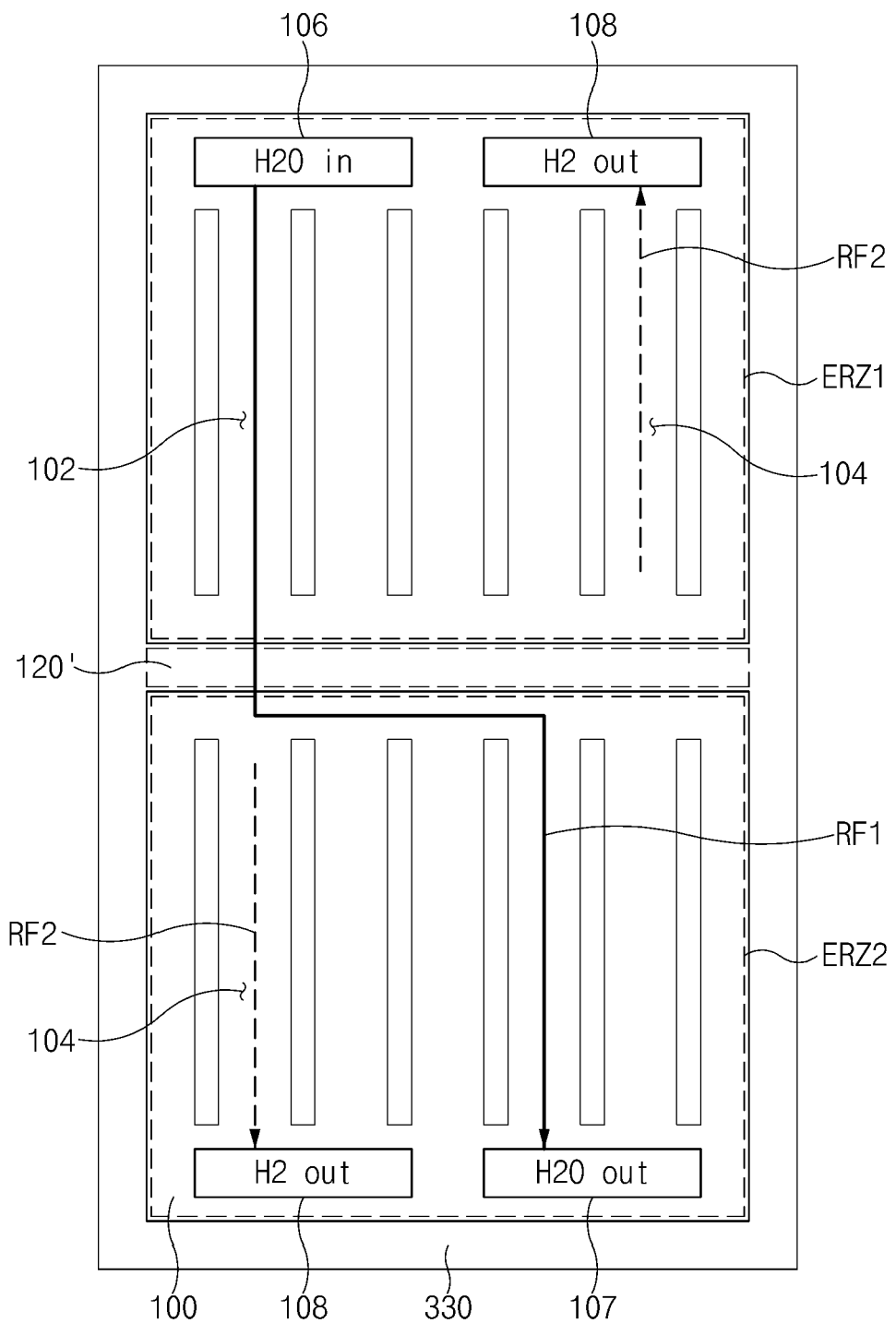
FIG. 12, FIG. 13 and FIG. 14 are views for explaining a modified example of the second partition wall portion of the electrochemical device according to the exemplary embodiment of the present invention.
Figure 13:
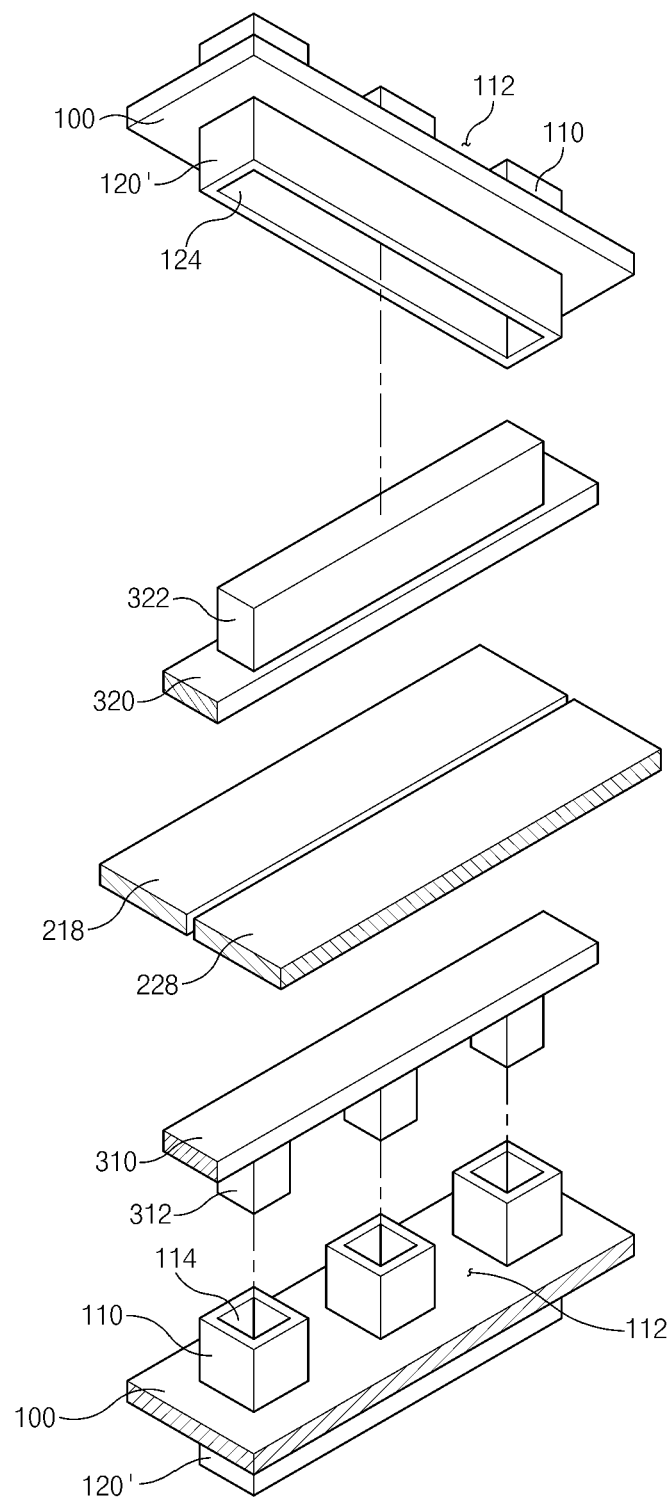
Figure 14:
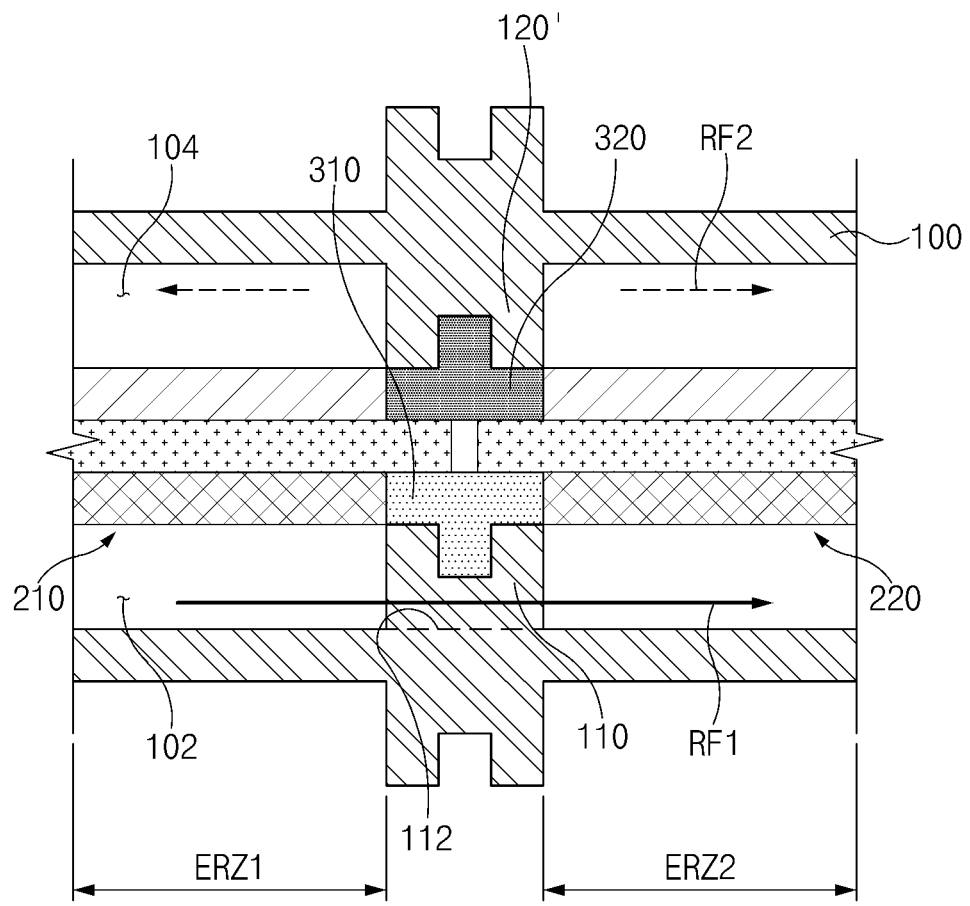

That is, referring to FIG. 12, and FIG. 13, according to the exemplary embodiment of the present invention, the electrochemical device 10 may include: the separator 100 including the first reaction region ERZ1 and the second reaction region ERZ2; the first reaction layers 210 disposed on the two opposite surfaces of the separator 100 and corresponding to the first reaction region ERZ1; the second reaction layers 220 disposed on the two opposite surfaces of the separator 100 and corresponding to the second reaction region ERZ2; the first partition wall portion 110 protruding from one surface of the separator 100, disposed along the boundary between the first reaction layer 210 and the second reaction layer 220, and including the first connecting flow path 112 configured to connect the first reaction region ERZ1 and the second reaction region ERZ2 so that the first reaction region ERZ1 and the second reaction region ERZ2 fluidically communicate with each other; the first sealing member 310 disposed at the end portion of the first partition wall portion 110 and configured to seal the portion between the first reaction layer 210 and the second reaction layer 220; a second partition wall portion 120' protruding from the other surface of the separator 100, disposed along the boundary between the first reaction layer 210 and the second reaction layer 220, and configured to block the first reaction region ERZ1 and the second reaction region ERZ2; and a second sealing member 320 disposed at the end portion of the second partition wall portion 120' and configured to seal the portion between the first reaction layer 210 and the second reaction layer 220.

Because the first connecting flow path 112 is provided in the first partition wall portion 110 disposed along the boundary between the first reaction region ERZ1 and the second reaction region ERZ2 as described above, the reaction fluid (e.g., the first reaction fluid), which is introduced into the first reaction region ERZ1 through the first manifold flow path 106, may flow to the second reaction region ERZ2 through the first connecting flow path 112 and then be discharged through the second manifold flow path 107.

In contrast, because the second partition wall portion 120' disposed along the boundary between the first reaction region ERZ1 and the second reaction region ERZ2 blocks the first reaction region ERZ1 and the second reaction region ERZ2, the second reaction fluid RF2 converted in the first reaction region ERZ1 may be discharged through the third manifold flow path 108 disposed in the first reaction region ERZ1 without flowing to the second reaction region ERZ2. Likewise, the second reaction fluid RF2 converted in the second reaction region ERZ2 may be discharged through the third manifold flow path 108 disposed in the second reaction region ERZ2 without flowing to the first reaction region ERZ1.

Because the second partition wall portion 120' has a continuous column shape (has a continuous partition wall structure having no connecting flow path) as described above, the pressing force of the second sealing member 320, which presses the boundary between the first gasket 218 and the second gasket 228, may be entirely uniformly provided when the fastening pressure (the fastening pressure for fastening the plurality of unit cells) is applied to the electrochemical device. Therefore, it is possible to obtain an advantageous effect of further improving the sealing performance implemented by the second sealing member 320 (the performance for sealing the gap between the first reaction layer 210 and the second reaction layer 220).

In addition, even in the case in which the second partition wall part 120' has a continuous column shape, the second coupling protrusion 322 may be provided on the second sealing member 320, and the second coupling groove 124 for accommodating the second coupling protrusion 322 may be provided in the second partition wall portion 120'.

According to the exemplary embodiment of the present invention described above, it is possible to obtain an advantageous effect of enlarging the reaction region without increasing the size of the reaction layer.

According to the exemplary embodiment of the present invention, it is possible to obtain an advantageous effect of enlarging the reaction region for the electrochemical reaction without increasing the sizes of the membrane electrode assembly, the gas diffusion layer, and the porous transport layer.

Among other things, according to the exemplary embodiment of the present invention, a manifold flow path need not be provided between the first reaction region and the second reaction region (a loss of space between the first reaction region and the second reaction region may be minimized). Therefore, it is possible to further enlarge the reaction region without increasing the size of the reaction layer.

In addition, according to the exemplary embodiment of the present invention, it is possible to obtain an advantageous effect of minimizing the deformation of and damage to the reaction layer and improving the safety and reliability.

In addition, according to the exemplary embodiment of the present invention, it is possible to obtain an advantageous effect of simplifying the structure and manufacturing process and reducing the costs.

In addition, according to the exemplary embodiment of the present invention, it is possible to obtain an advantageous effect of improving the degree of design freedom and spatial utilization.

In addition, according to the exemplary embodiment of the present invention, it is possible to implement both the cathode separator and the anode separator using the single type of separator including the same structure.

In addition, according to the exemplary embodiment of the present invention, it is possible to obtain an advantageous effect of reducing the weight and size of the product and decreasing the manufacturing costs.

In addition, according to the exemplary embodiment of the present invention, it is possible to obtain an advantageous effect of minimizing the position deviation of the separator and improving the safety and reliability.

In addition, according to the exemplary embodiment of the present invention, it is possible to obtain an advantageous effect of inhibiting the occurrence of contact resistance of the separator and improving the mobility of electrons and the efficiency.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electrochemical apparatus comprising:
    a separator including a first reaction region and a second reaction region;
    a first reaction layer disposed to correspond to the first reaction region;
    a second reaction layer disposed to correspond to the second reaction region;
    a first partition wall portion protruding from a first surface of the separator, disposed along a boundary between the first reaction layer and the second reaction layer, and including a first connecting flow path configured to connect the first reaction region and the second reaction region so that the first reaction region and the second reaction region fluidically communicate with each other through the first connecting flow path;
    a first sealing member disposed at an end portion of the first partition wall portion and configured to seal a portion between the first reaction layer and the second reaction layer;
    a first coupling protrusion protruding from the first sealing member; and
    a first coupling groove provided in the first partition wall portion and configured to accommodate the first coupling protrusion therein.

2. The electrochemical apparatus of claim 1, wherein the first reaction layer includes:
    a first membrane electrode assembly;
    a first gas diffusion layer disposed on a first surface of the first membrane electrode assembly;
    a first porous transport layer disposed on a second surface of the first membrane electrode assembly; and
    a first gasket provided around the first membrane electrode assembly,
    wherein the second reaction layer includes:
    a second membrane electrode assembly;
    a second gas diffusion layer disposed on a first surface of the second membrane electrode assembly;
    a second porous transport layer disposed on a second surface of the second membrane electrode assembly; and
    a second gasket provided around the second membrane electrode assembly, and
    wherein the first sealing member covers a boundary between the first gasket and the second gasket.

3. The electrochemical apparatus of claim 1, further including:
    a first channel disposed on the first surface of the separator and configured to allow a first reaction fluid to flow therethrough; and
    a second channel disposed on a second surface of the separator and configured to allow a second reaction fluid to flow therethrough.

4. The electrochemical apparatus of claim 3, further including:
- a first manifold flow path disposed in the first reaction region; and
- a second manifold flow path disposed in the second reaction region,
- wherein the first reaction fluid introduced into the first manifold flow path passes through the first reaction region and the second reaction region and then is discharged through the second manifold flow path.

5. The electrochemical apparatus of claim 4, further including:
- a third manifold flow path disposed in at least one of the first reaction region and the second reaction region,
- wherein the second reaction fluid is discharged through the third manifold flow path.

6. The electrochemical apparatus of claim 1, further including:
- a second partition wall portion protruding from a second surface of the separator, disposed along the boundary between the first reaction layer and the second reaction layer, and including a second connecting flow path configured to connect the first reaction region and the second reaction region so that the first reaction region and the second reaction region fluidically communicate with each other through the second connecting flow path.

7. The electrochemical apparatus of claim 6, further including:
- a second sealing member disposed at an end portion of the second partition wall portion and configured to seal a portion between the first reaction layer and the second reaction layer.

8. The electrochemical apparatus of claim 7, further including:
- a second coupling protrusion protruding from the second sealing member; and
- a second coupling groove provided in the second partition wall portion and configured to accommodate the second coupling protrusion therein.

9. The electrochemical apparatus of claim 1, further including:
- a second partition wall portion protruding from a second surface of the separator, disposed along the boundary between the first reaction layer and the second reaction layer, and configured to block the first reaction region and the second reaction region.

10. The electrochemical apparatus of claim 9,
- a second sealing member disposed at an end portion of the second partition wall portion and configured to seal a portion between the first reaction layer and the second reaction layer.

11. The electrochemical apparatus of claim 10, further including:
- a second coupling protrusion protruding from the second sealing member; and
- a second coupling groove provided in the second partition wall portion and configured to accommodate the second coupling protrusion therein.

12. The electrochemical apparatus of claim 1, further including:
- an edge sealing member disposed along an edge portion of the separator and configured to seal portions between the separator and the first and second reaction layers.

13. The electrochemical apparatus of claim 1, wherein the first reaction layer and the second reaction layer each have a smaller size than the separator.

* * * * *